US008499142B1

(12) United States Patent
Ramamurthy et al.

(10) Patent No.: US 8,499,142 B1
(45) Date of Patent: Jul. 30, 2013

(54) UEFI BOOT LOADER FOR LOADING NON-UEFI COMPLIANT OPERATING SYSTEMS

(75) Inventors: Venkatesh Ramamurthy, Lilburn, GA (US); Vinothkumar Sundaramoorthy, Norcross, GA (US)

(73) Assignee: American Megatrends, Inc., Norcross, GA (US)

( * ) Notice: Subject to any disclaimer, the term of this patent is extended or adjusted under 35 U.S.C. 154(b) by 408 days.

(21) Appl. No.: 12/871,238

(22) Filed: Aug. 30, 2010

Related U.S. Application Data

(60) Provisional application No. 61/366,881, filed on Jul. 22, 2010.

(51) Int. Cl.
*G06F 15/177* (2006.01)
(52) U.S. Cl.
USPC .................................. 713/2; 713/1; 713/100
(58) Field of Classification Search
None
See application file for complete search history.

(56) References Cited

U.S. PATENT DOCUMENTS

| 7,676,665 | B2 | 3/2010 | Wyatt | |
|---|---|---|---|---|
| 2003/0110370 | A1* | 6/2003 | Fish et al. | 713/2 |
| 2004/0068645 | A1* | 4/2004 | Larvoire | 713/1 |
| 2005/0071620 | A1* | 3/2005 | Natu | 713/2 |
| 2005/0091349 | A1 | 4/2005 | Scheibli | |
| 2006/0080522 | A1 | 4/2006 | Button et al. | |
| 2006/0282651 | A1 | 12/2006 | Hobson | |
| 2008/0064501 | A1 | 3/2008 | Patel | |

OTHER PUBLICATIONS

Jones, MT, Linux initial RAM disk (initrd) overview, Jul. 31, 2006 [online][retrieved on Dec. 9, 2010] Retrieved from: http://www.ibm.com/developerworks/linux/library/1-initrd.html, pp. 1-12.
U.S. Official Action dated Nov. 7, 2012 in U.S. Appl. No. 13/015,642, First Named Inventor: Rajasekhar, Filing Date: Jan. 28, 2011.
U.S. Notice of Allowance/Allowability dated Feb. 21, 2013 in U.S. Appl. No. 13/015,642, First Named Inventor: Rajasekhar, Filing Date: Jan. 28, 2011.

* cited by examiner

*Primary Examiner* — Dennis M Butler
(74) *Attorney, Agent, or Firm* — Hope Baldauff, LLC (57) ABSTRACT

A UEFI compliant firmware is disclosed that includes a UEFI legacy boot loader. The UEFI legacy boot loader provides functionality for loading operating systems that are non-UEFI compliant in a performant manner. In particular, the UEFI legacy boot loader provided in one embodiment disclosed herein is configured to utilize UEFI disk services to load an O/S kernel and other O/S components. Once the UEFI legacy boot loader has completed loading the O/S components, the UEFI legacy boot loader enables interrupt handling by the O/S, relocates O/S real mode kernel setup code to a low memory region (below 1 MB), and switches a processor to a real mode of operation. The UEFI legacy boot loader then causes the real mode kernel setup code to be executed on the processor, to thereby complete the loading of the operating system.

20 Claims, 5 Drawing Sheets

UEFI BOOT LOADER FOR LOADING NON-UEFI COMPLIANT OPERATING SYSTEMS

CROSS-REFERENCE TO RELATED APPLICATIONS

This application claims the benefit of provisional U.S. patent application No. 61/366,881, entitled "UEFI BOOT LOADER FOR LOADING NON-UEFI COMPLIANT OPERATING SYSTEMS", which was filed on Jul. 22, 2010, and which is expressly incorporated herein by reference in its entirety.

BACKGROUND

In many computing systems, low-level instruction code, or firmware, is used as an intermediary between the hardware components of the computing system and high-level software executing on the computing system, such as an operating system. The firmware provides a set of software routines that allow high-level software to interact with the hardware components of the computing system using standard calls. In some computer systems, this low-level instruction code is a Basic Input/Output System ("BIOS"). In other systems, the low-level instruction code is an Extensible Firmware Interface ("EFI")—compatible firmware. EFI firmware may also be configured according to a specification released by the Unified EFI ("UEFI") forum (the "UEFI Specification"). Such a firmware is referred to herein as a UEFI compliant or enabled firmware.

Computer system firmware typically provides functionality for loading an operating system. In particular, many firmware implementations first perform hardware and memory initialization. The firmware then loads the operating system by loading the first sector of a disk drive (the master boot record or "MBR") and transferring program control to it. Program code in the MBR then loads a boot manager, which in turn loads an operating system kernel, boot drivers, and other software components needed to boot the operating system. For some operating systems, the boot manager also loads an initial random access memory ("RAM") disk that contains software modules that assist in further booting the computer.

Firmware that implements the UEFI Specification includes a UEFI boot loader that can directly load operating systems that support the UEFI Specification. Operating systems that directly support the UEFI Specification can also issue service calls to a platform layer present in the UEFI enabled firmware. Many modern 64-bit operating systems are UEFI-enabled and use this feature of the UEFI enabled firmware.

When a UEFI compliant firmware loads a non-UEFI enabled operating system, however, the boot manager present on disk must be utilized to load the operating system rather than the UEFI boot loader. The disk-based boot manager loads the operating system, drivers, registry, initial RAM disk, and possibly other components using a legacy interrupt 13h ("INT 13h") service mechanism. As known to those skilled in the art, INT 13h is a legacy firmware service that provides read and write access to mass storage devices.

Performance is a significant issue when using the INT 13h service mechanism. This is due in part to the fact that legacy firmware does not use direct memory access ("DMA") to implement the INT 13h service, which is typically available from disk controllers to read or write data in a high performance fashion. As a result, this can cause the time required for a UEFI compliant firmware to load a non-compliant operating system to be relatively high.

It is with respect to these and other considerations that the disclosure made herein is presented.

SUMMARY

Technologies are described herein for a high-performance UEFI boot loader for loading non-UEFI compliant operating systems. Through the utilization of the technologies and concepts presented herein, a UEFI compliant firmware can load a non-UEFI compliant operating system significantly faster than possible utilizing previous firmware implementations.

According to one aspect presented herein, a UEFI compliant firmware is disclosed that includes a UEFI legacy boot loader. The UEFI legacy boot loader provides functionality for loading operating systems that are non-UEFI compliant in a performant manner. In particular, the UEFI legacy boot loader provided in one embodiment disclosed herein is configured to utilize UEFI disk services to load an O/S kernel and other O/S components. UEFI disk services utilize DMA to enable high performance file transfers. UEFI disk services might also execute in 64-bit mode on certain systems, thereby enabling fast loading of an operating system.

Once the UEFI legacy boot loader has completed loading the O/S components, the UEFI legacy boot loader enables interrupt handling by the O/S, relocates O/S real mode kernel setup code to a memory region below 1 MB, and switches the processor to a real mode of operation. The UEFI legacy boot loader then causes the real mode kernel setup code to be executed, thereby completing loading of the operating system.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Embodiments of the disclosure presented herein provide methods, systems, apparatuses, and computer-readable media for a UEFI boot loader for loading non-UEFI compliant operating systems. In the following detailed description, references are made to the accompanying drawings that form a part hereof, and in which are shown by way of illustration specific embodiments or examples. Referring now to the drawings, in which like numerals represent like elements throughout the several figures, aspects of an exemplary operating environment and the implementations provided herein will be described.

Figure 1:
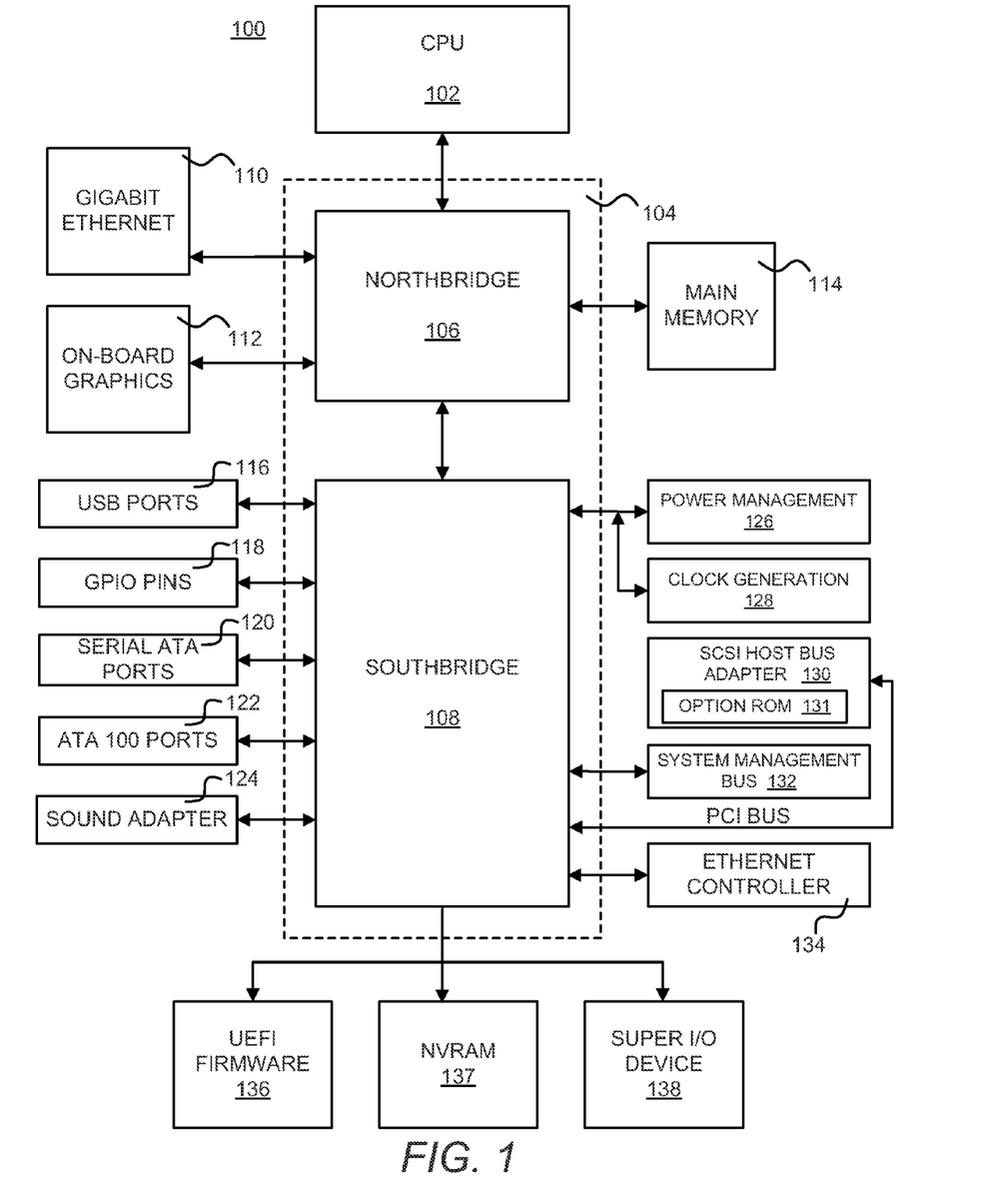
FIG. 1 is a computer architecture diagram that illustrates various components of a computer that provides an illustrative operating environment for the implementations presented herein.

FIG. 1 and the following discussion are intended to provide a brief, general description of a suitable computing environment in which embodiments presented herein may be implemented. While the embodiments presented herein are described in the general context of program modules that execute in conjunction with the execution of a computer firmware, those skilled in the art will recognize that various embodiments may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, embedded systems, and the like. Embodiments presented herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments discussed herein will be described. It should be appreciated that although the embodiments described herein are discussed in the context of a conventional desktop or server computer, the embodiments may be utilized with virtually any type of computing device. FIG. 1 shows an illustrative computer architecture for a computer 100 that is operative to provide a UEFI boot loader capable of loading non-UEFI compliant operating systems in a performant manner.

In order to provide the functionality described herein, the computer 100 can include a baseboard, or motherboard. The motherboard can be a printed circuit board to which a multitude of components or devices may be connected by way of a system bus or other electrical communication path. In one illustrative embodiment, a central processing unit ("CPU") 102 can operate in conjunction with a chipset 104. The CPU 102 may be a standard central processor that performs arithmetic and logical operations necessary for the operation of the computer.

The chipset 104 includes a northbridge 106 and a southbridge 108. The northbridge 106 provides an interface between the CPU 102 and the remainder of the computer 100. The northbridge 106 also provides an interface to a random access memory ("RAM") used as the main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to another computer via a network. Connections that may be made by the Ethernet adapter 110 may include local area network ("LAN") or wide area network ("WAN") connections. LAN and WAN networking environments are commonplace in offices, enterprise-wide computer networks, intranets, and the Internet. The northbridge 106 is connected to the southbridge 108.

The southbridge 108 is responsible for controlling many of the input/output functions of the computer 100. In particular, the southbridge 108 may provide one or more universal serial bus ("USB") ports 116, a sound adapter 124, an Ethernet controller 134, and one or more general purpose input/output ("GPIO") pins 118. The southbridge 108 may also provide a bus for interfacing peripheral card devices such as a BIOS boot system-compliant SCSI host bus adapter 130. In one embodiment, the bus comprises a peripheral component interconnect ("PCI") bus. The southbridge 108 may also provide a system management bus 132 for use in managing the various components of the computer 100. Power management circuitry 126 and clock generation circuitry 128 may also be utilized during the operation of the southbridge 108.

The southbridge 108 is also operative to provide one or more interfaces for connecting mass storage devices to the computer 100. For instance, according to an embodiment, the southbridge 108 includes a serial advanced technology attachment ("SATA") adapter for providing one or more SATA ports 120 and an ATA100 adapter for providing one or more ATA100 ports 122. The SATA ports 120 and the ATA100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the southbridge 108 and the SCSI host bus adapter 130, and their associated computer-storage media, provide non-volatile storage for the computer 100. Although the description of computer-storage media contained herein refers to a mass storage device, such as a hard disk or CD-ROM drive, it should be appreciated by those skilled in the art that computer-storage media can be any available media that can be accessed by the computer 100. Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the southbridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a computer storage media such as a ROM or a flash memory such as a non-volatile random access memory ("NVRAM") for storing the firmware 136 that includes program code containing the basic routines that help to start up the computer 100 and to transfer information between elements within the computer 100. In one embodiment, the firmware 136 is a firmware that is compatible with the UEFI Specification. The LPC interface may also be utilized to connect a NVRAM 137 to the computer 100. The NVRAM 137 may be utilized by the firmware 136 to store configuration data for the computer 100. The configuration data for the computer 100 may also be stored on the same NVRAM 137 as the firmware 136.

The computer 100 may be implemented as a conventional computer system, an embedded control computer, a laptop, or a server computer, a mobile device, a set-top box, a kiosk, a vehicular information system, a mobile telephone, a customized machine, or other hardware platform. The CPU 102 may be a general purpose processor, a processor core, a multiprocessor, a multi-core processor, a graphics processor, a digital signal processing ("DSP") processor, a customized computing device implemented within an application specific integrated circuit ("ASIC"), a customized computing device implemented within a field programmable gate array ("FPGA"), a customized computing device implemented within any type of programmable logic, a state machine, a reconfigurable processor, any other processing unit, or any combination or multiplicity thereof.

It should be appreciated that the program modules disclosed herein, including the firmware 136, may include software instructions that, when loaded into the CPU 102 and executed, transform a general-purpose computing system into a special-purpose computing system customized to facilitate all, or part of, the operations disclosed herein. As detailed throughout this description, the program modules may provide various tools or techniques by which the computer 100 may participate within the overall systems or operating environments using the components, logic flows, and/or data structures discussed herein.

The CPU 102 may be constructed from any number of transistors or other circuit elements, which may individually or collectively assume any number of states. More specifically, the CPU 102 may operate as a state machine or finite-state machine. Such a machine may be transformed to a second machine, or a specific machine, by loading executable instructions contained within the program modules. These computer-executable instructions may transform the CPU 102 by specifying how the CPU 102 transitions between states, thereby transforming the transistors or other circuit elements constituting the CPU 102 from a first machine to a second machine, wherein the second machine may be specifically configured to perform the operations disclosed herein. The states of either machine may also be transformed by receiving input from one or more user input devices, network interfaces 110, 134, other peripherals, other interfaces, or one or more users or other actors. Either machine may also transform states, or various physical characteristics of various output devices such as printers, speakers, video displays, or otherwise.

Encoding the program modules may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules may transform the physical state of the semiconductor memory 114, 136, 137 when the software or firmware is encoded therein. For example, the software may transform the state of transistors, capacitors, or other discrete circuit elements constituting the semiconductor memory.

As another example, the storage media may be implemented using magnetic or optical technology such as hard drives or optical drives. In such implementations, the program modules may transform the physical state of magnetic or optical media, when the software is encoded therein. These transformations may include altering the magnetic characteristics of particular locations within given magnetic media. These transformations may also include altering the physical features or characteristics of particular locations within given optical media to change the optical characteristics of those locations. It should be appreciated that various other transformations of physical media are possible without departing from the scope and spirit of the present description.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
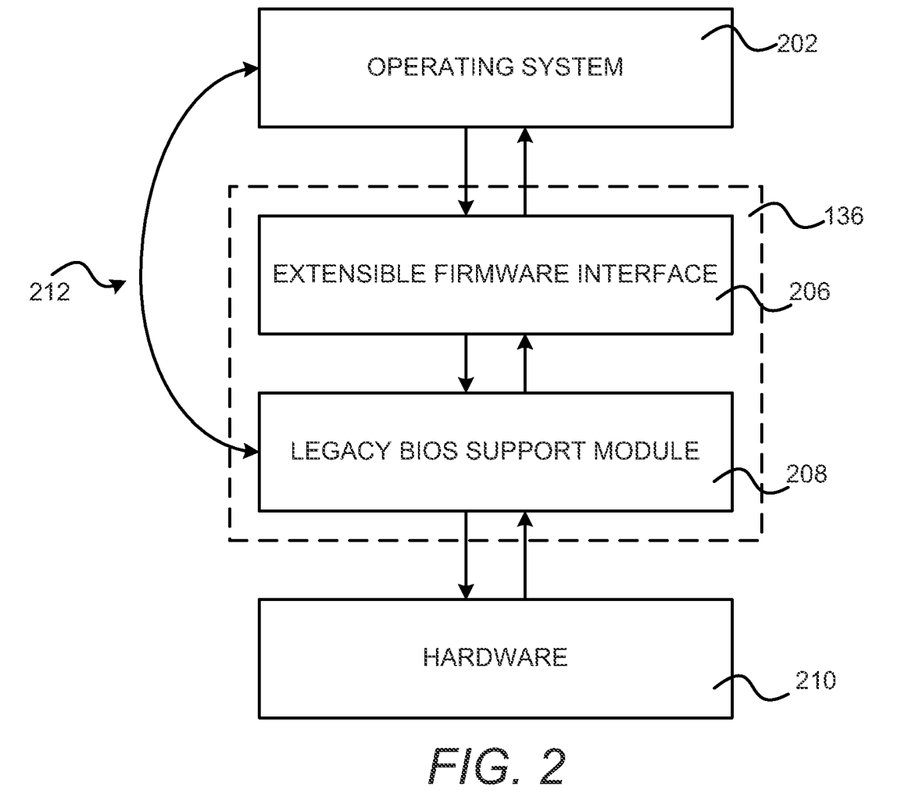
FIG. 2 is a block diagram illustrating aspects of an interface between a UEFI specification-compliant firmware and an operating system according to one or more embodiments presented herein.

Referring now to FIG. 2, a block diagram illustrates aspects of an interface between a UEFI firmware 136 and an operating system 202 according to one or more embodiments presented herein. As described with respect to FIG. 1, the firmware 136 may comprise a firmware compatible with the UEFI Specification (which may be referred to herein as the "Specification") from INTEL CORPORATION or from the UEFI FORUM. The UEFI Specification describes an interface between the operating system 202 and the system firmware 136. The UEFI Specification also defines an interface that platform firmware may implement, and an interface that the operating system 202 may use while booting. How the firmware 136 implements the interface may be left up to the manufacturer of the firmware. The Specification can define a way for the operating system 202 and firmware 136 to communicate information necessary to support the operating system boot process.

According to some embodiments, both a UEFI-compatible firmware 206 and a legacy BIOS support module 208 may be present in the UEFI firmware 136. This allows the computer 100 to support a UEFI firmware interface and a legacy BIOS firmware interface. In order to provide this functionality, an interface 212 may be provided for use by legacy operating systems and applications. According to other embodiments, only one of the UEFI-compatible firmware 206 and the legacy BIOS support module 208 may be present in the firmware 136. According to yet other embodiments, the firmware 136 may interface with the hardware 210 through any of various other architectures, components, or modules for the firmware without specific involvement of the UEFI-compatible firmware 206 or the legacy BIOS support module 208.

Additional details regarding the operation and architecture of a UEFI Specification compliant-firmware can be found in the UEFI Specification and in the specifications that make up the EFI Framework, both of which are available from INTEL CORPORATION and are expressly incorporated herein by reference.

Figure 3:
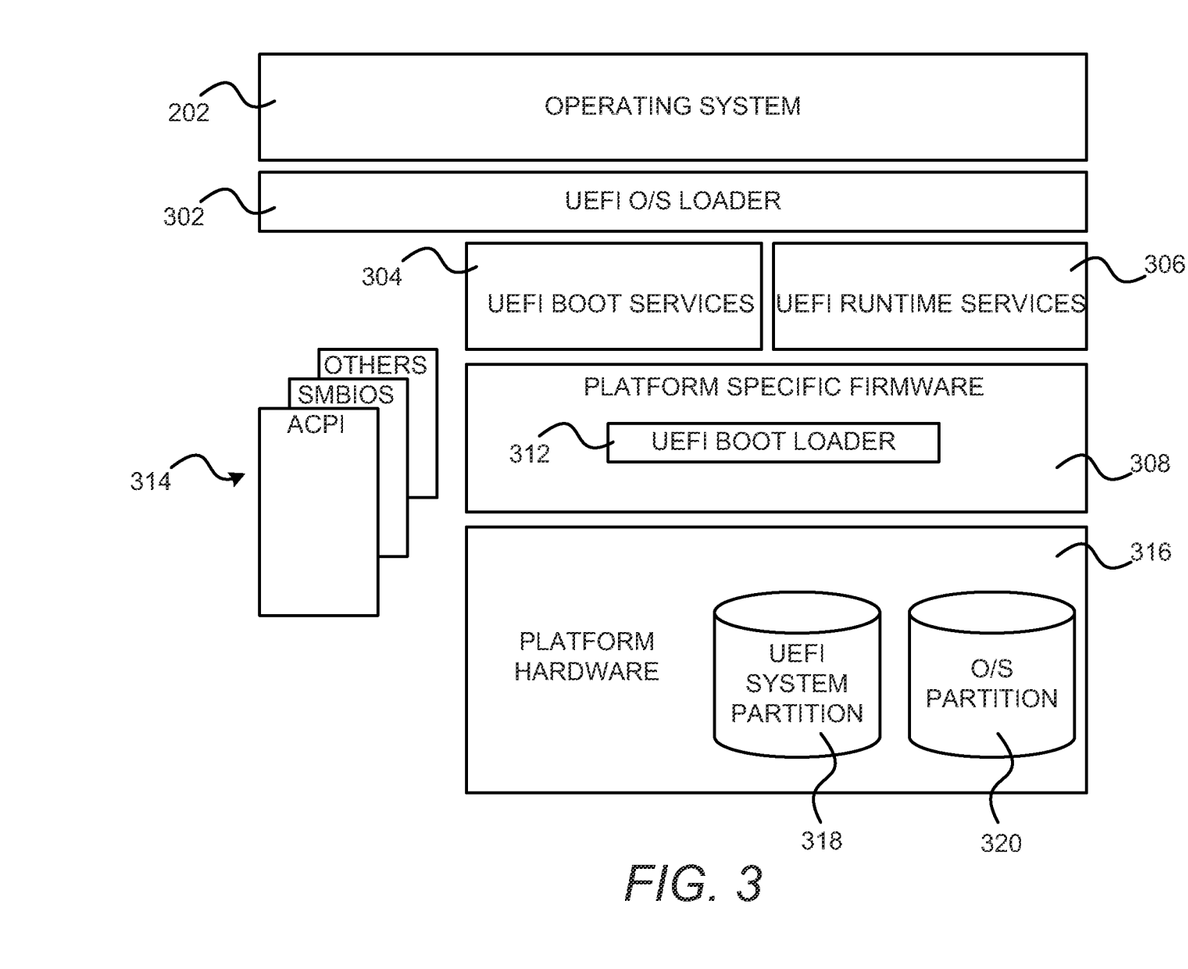
FIG. 3 is a block diagram illustrating an architecture for a UEFI specification-compliant firmware that provides an operating environment for one or more embodiments presented herein.

Turning now to FIG. 3, a block diagram illustrates the architecture for a UEFI specification-compliant firmware that provides an operating environment for one or more embodiments presented herein. As shown in FIG. 3, the architecture can include platform hardware 316 and an operating system 202. The platform specific firmware 308 may retrieve an operating system ("OS" or "O/S") image from the UEFI system partition 318 using an UEFI operating system loader 302. The UEFI system partition 318 may be an architecturally shareable system partition. As such, the UEFI system partition 318 can define a partition and file system designed to support safe sharing of mass storage between multiple vendors. An OS partition 320 may also be utilized.

Once started, the UEFI OS loader 302' may continue to boot the complete operating system 202. In doing so, the UEFI OS loader 302 may use UEFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface ("ACPI") and the System Management BIOS ("SMBIOS") specifications may be supported.

UEFI boot services 304 may provide interfaces for devices and system functionality used during boot time. UEFI runtime services 306 may also be available to the UEFI OS loader 302 during the boot phase. For example, a set of runtime services may be presented to ensure appropriate abstraction of base platform hardware resources used by the operating system 202 during its operation. UEFI allows extension of platform firmware by loading UEFI driver and UEFI application images which, when loaded, have access to UEFI-defined runtime and boot services.

Various program modules can provide the boot-time and run-time services. These program modules may be loaded by the UEFI boot loader 312 at system boot time. The UEFI boot loader 312 is a component in the UEFI firmware that determines which program modules should be explicitly loaded and when. Once the UEFI firmware is initialized, it passes control to the UEFI boot loader 312. The UEFI boot loader 312 may then determine which of the program modules to load and in what order.

Figure 4:
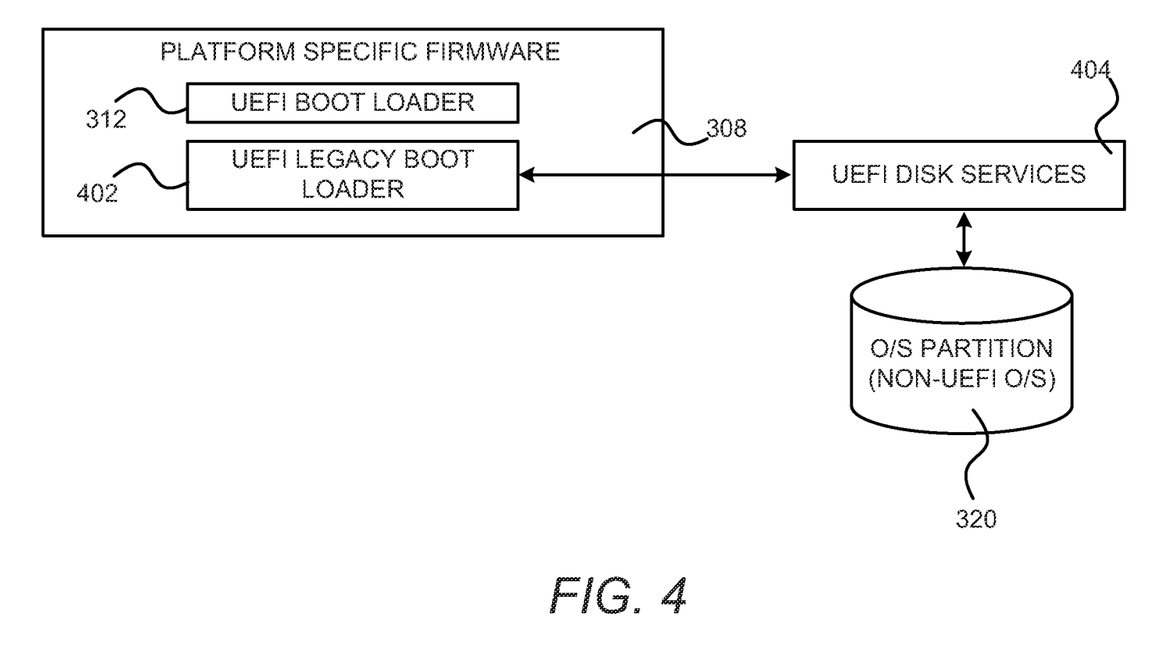
FIG. 4 is a block diagram illustrating additional aspects of an architecture for a UEFI specification-compliant firmware that includes a UEFI boot loader capable of loading a non-UEFI compliant operating system in one embodiment disclosed herein.

Referring now to FIG. 4, details will be provided regarding aspects of a UEFI legacy boot loader 402 provided in one embodiment disclosed herein. As illustrated in FIG. 4, the UEFI legacy boot loader 402 is provided as a part of the platform specific firmware 308 in one embodiment disclosed herein. As will be described in greater detail below, the UEFI legacy boot loader 402 is configured to load a non-UEFI compliant O/S 320 in a performant manner. In order to provide this functionality, the UEFI legacy boot loader 402 utilizes UEFI disk services 404. The UEFI disk services 404 utilize DMA to perform disk reads and writes in a performant manner. On certain systems, the UEFI disk services 404 may also execute as 64-bit code. This also might provide a performance gain. As will be described in greater detail below, the use of the UEFI disk services 404 allows an O/S to be loaded significantly faster than previous solutions that utilize an INT 13h mechanism. Additional details regarding this process will be provided below with regard to FIG. 5.

Figure 5:
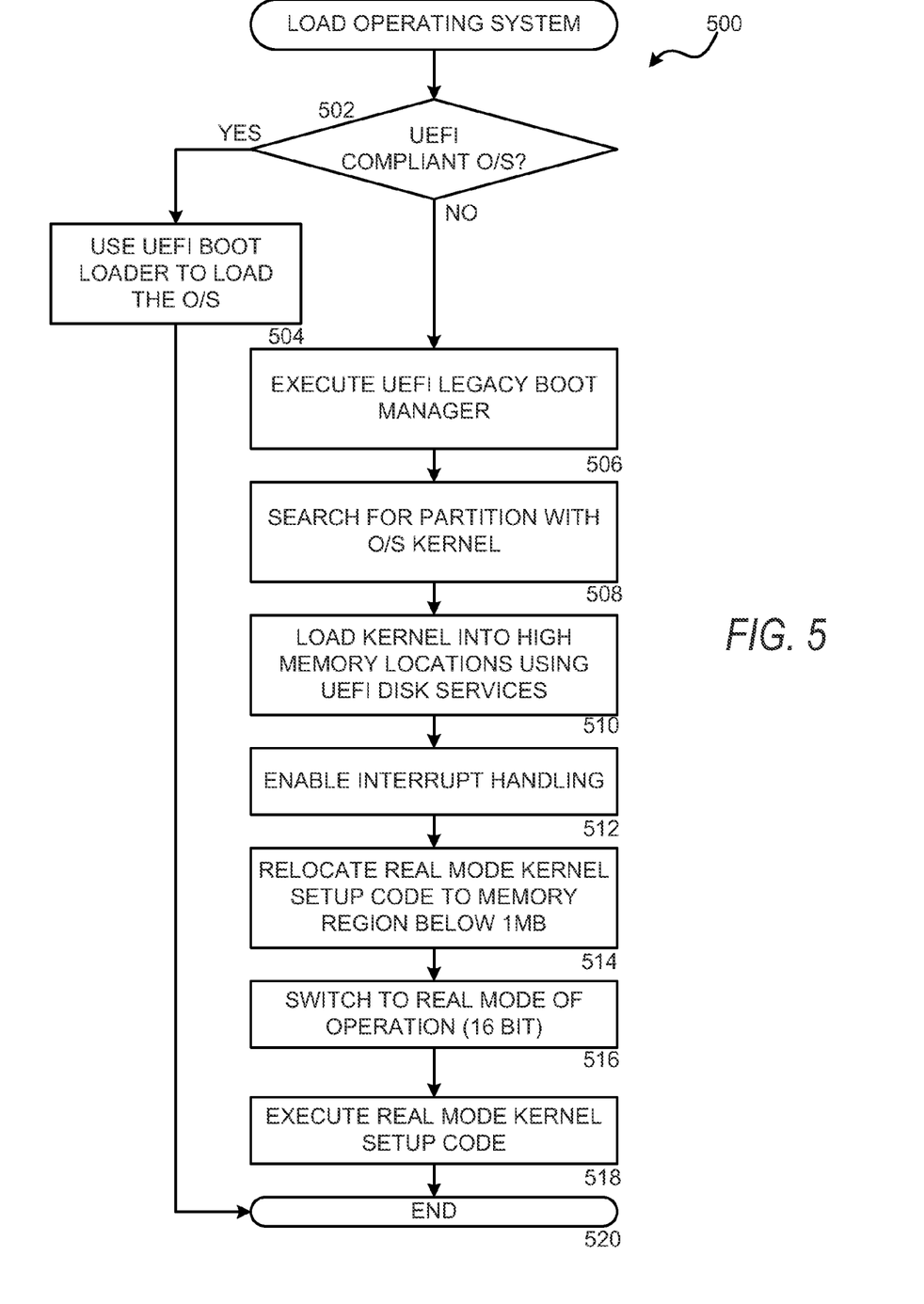
FIG. 5 is a flow diagram showing aspects of the operation of a UEFI compliant firmware that includes a UEFI boot loader capable of loading a non-UEFI compliant operating system in one embodiment disclosed herein.

Turning now to FIG. 5, additional details will be provided regarding the embodiments disclosed herein for providing a UEFI boot loader capable of loading a non-UEFI compliant operating system in a performant manner. In particular, FIG. 5 is a flow diagram showing a routine 500 that illustrates aspects of a process for loading a non-UEFI compliant operating system according to embodiments presented herein. The process illustrated in FIG. 5 may be performed by various components that make up the UEFI firmware 136 shown in FIG. 3.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 500 begins at operation 502, where the UEFI firmware 136 determines whether a UEFI compliant operating system or a non-UEFI compliant operating system is to be loaded. If a UEFI compliant operating system is to be loaded, the routine 500 proceeds from operation 502 to operation 504. At operation 504, the UEFI boot loader loads the UEFI compliant operating system in a conventional fashion. The routine 500 then continues to operation 520, where it ends.

If, at operation 502, the UEFI firmware 136 determines that a non-UEFI compliant O/S is to be loaded, the routine 500 proceeds to operation 506. At operation 506, the UEFI legacy boot loader 402 is executed in a 32/64 bit protected mode like other UEFI applications/drivers. As discussed above, the UEFI legacy boot loader 402 provides functionality for the performant loading of a non-UM compliant O/S. Details of the operation of the UEFI legacy boot loader 402 are provided below with respect to operations 508-518.

From operation 506, the routine 500 proceeds to operation 508, where the UEFI legacy boot loader 402 searches for a disk partition with the O/S kernel to be loaded. FIG. 4, for instance, shows a partition 320 that contains a non-UEFI compliant O/S. The partition can be a regular file system (like NTFS, FAT, EXT2/EXT3/EXT4, BTRFS, etc.) or a special partition containing the O/S kernel and possibly other boot-related files as a raw dump. This partition type can either be one of the file system types, a recovery type, or another OEM type. Once the partition has been identified, the routine 500 proceeds from operation 508 to operation 510.

At operation 510, the UEFI legacy boot loader 402 loads the O/S kernel from the identified partition into high memory (>1 MB) using the UEFI disk services 404. As discussed briefly above, the UEFI disk services 404 utilize DMA to perform disk reads and writes in a performant manner. On certain systems, the UEFI disk services 404 may also execute as 64-bit code. The UEFI legacy boot loader 402 may also load other files, such as an initial RAM disk, drivers, a registry, and others. Once these files have been loaded into memory, the routine 500 proceeds from operation 510 to operation 512.

At operation 512, the UEFI legacy boot loader 402 enables interrupt handling for the non-UEFI compliant O/S. The routine 500 then proceeds to operation 514, where the UEFI legacy boot loader 402 relocates the O/S real mode kernel setup code to a low memory region (below 1 MB). The routine 500 then proceeds to operation 516, where the UEFI legacy boot loader 402 switches the CPU 102 to the real mode of operation. It should be appreciated that, in one embodiment, portions of the real mode kernel setup code are implemented in the UEFI firmware 136. In this implementation, it is not necessary to make a switch to 16-bit real mode.

Once the CPU has been switched to the real mode of operation, the routine 500 proceeds to operation 518, where the UEFI legacy boot loader 402 causes the real mode kernel setup code to be executed from the low memory area. The real mode kernel setup code then executes to complete the loading and initialization of the O/S. The routine 500 proceeds from operation 518 to operation 520, where it ends.

It should be appreciated that, according to implementations, the mechanism disclosed herein may provide as much as a 10 fold increase in performance over previous implementations. For instance, loading a LINUX O/S having an O/S kernel size of 4 MB and a 43 MB initial RAM disk takes approximately four seconds utilizing a conventional INT 13h mechanism. Loading the same O/S utilizing the embodiments presented herein takes approximately 300-400 ms. The mechanism disclosed herein, therefore, may be capable of improving O/S load times by as much as a factor of ten. It should be appreciated that this example is only illustrative and is not intended to limit the technology provided herein to any particular performance improvement percentage.

Based on the foregoing, it should be appreciated that technologies for providing a UEFI boot loader capable of loading non-UEFI compliant operating systems have been presented herein. It should be appreciated that the embodiments disclosed herein might be utilized with many different operating systems, such as the LINUX operating system and the WINDOWS operating system from MICROSOFT CORPORATION.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for loading a non-Unified Extensible Firmware Interface ("UEFI") compliant operating system, the method comprising performing computer-implemented operations for:
   loading an operating system kernel into a high memory region utilizing direct memory access;
   enabling interrupt handling for the non-UEFI compliant operating system once the operating system kernel has been loaded;
   relocating a real mode kernel setup code from the high memory region to a low memory region;
   switching a central processing unit to a real mode of operation; and
   causing the real mode kernel setup code to be executed on the central processing unit from the low memory region.

2. The computer-implemented method of claim 1, wherein the operating system kernel is non-UEFI compliant.

3. The computer-implemented method of claim 2, wherein the loading, enabling, relocating, switching, and causing operations are performed by a UEFI legacy boot loader.

4. The computer-implemented method of claim 3, wherein the UEFI legacy boot loader is executed in a 32/64 bit protected mode of operation.

5. The computer-implemented method of claim 2, wherein the operating system kernel is loaded into the high memory region utilizing one or more UEFI disk services.

6. The computer-implemented method of claim 5, wherein the UEFI disk services are executed in a 64-bit mode of operation.

7. The computer-implemented method of claim 6, wherein the low memory region comprises a memory region below 1 MB and the high memory region comprises a memory region above 1 MB.

8. The computer-implemented method of claim 7, wherein the real mode kernel setup code completes loading and initialization of the non-UEFI compliant operating system.

9. A computer-readable storage medium having computer-executable instructions stored thereupon which, when executed by a computer, cause the computer to:
   load an operating system kernel into a high memory region utilizing direct memory access;
   enable interrupt handling for the operating system kernel once the operating system kernel has been loaded;
   relocate a real mode kernel setup code from the high memory region to a low memory region;
   switch a central processing unit to a real mode of operation; and to
   cause the real mode kernel setup code to be executed on the central processing unit.

10. The computer-readable storage medium of claim 9, wherein the operating system kernel is non-Unified Extensible Firmware Interface ("UEFI") compliant.

11. The computer-readable storage medium of claim 10, wherein a UEFI legacy boot loader is executed in a 32/64 bit protected mode of operation.

12. The computer-readable storage medium of claim 11, wherein the operating system kernel is loaded into the high memory region utilizing one or more UEFI disk services.

13. The computer-readable storage medium of claim 12, wherein the UEFI disk services are executed in a 64-bit mode of operation.

14. The computer-readable storage medium of claim 13, wherein the low memory region comprises a memory region below 1 MB and the high memory region comprises a memory region above 1 MB.

15. The computer-readable storage medium of claim 14, wherein the real mode kernel setup code is configured to complete the loading and initialization of a non-UEFI compliant operating system.

16. An apparatus comprising:
   a central processing unit (CPU);
   a random access memory (RAM); and
   a non-volatile memory storing a UEFI-compliant firmware which, when executed by the CPU, will cause the CPU to load an operating system kernel into a high memory region of the RAM utilizing direct memory access, to enable interrupt handling for the operating system kernel once the operating system kernel has been loaded, to relocate a real mode kernel setup code from the high memory region of the RAM to a low memory region of the RAM, to switch the CPU to a real mode of operation, and to cause the real mode kernel setup code to be executed on the CPU in the low memory region of the RAM.

17. The apparatus of claim 16, wherein the operating system kernel is non-Unified Extensible Firmware Interface ("UEFI") compliant.

18. The apparatus of claim 17, wherein the operating system kernel is loaded into the high memory region utilizing one or more UEFI disk services.

19. The apparatus of claim 18, wherein the UEFI disk services are executed in a 64-bit mode of operation.

20. The apparatus of claim 19, wherein the real mode kernel setup code is configured to complete the loading and initialization of a non-UEFI compliant operating system.

* * * * *